(12) United States Patent
Mochiduki et al.

(10) Patent No.: US 7,261,179 B2
(45) Date of Patent: Aug. 28, 2007

(54) DETECTION APPARATUS FOR OCCUPANT OF A SEAT

(75) Inventors: Tetsumei Mochiduki, Wako (JP); Makoto Nagai, Wako (JP)

(73) Assignee: Honda Motor Co., Ltd., Minato-ku (JP)

( * ) Notice: Subject to any disclaimer, the term of this patent is extended or adjusted under 35 U.S.C. 154(b) by 494 days.

(21) Appl. No.: 10/915,631

(22) Filed: Aug. 10, 2004

(65) Prior Publication Data

US 2005/0039966 A1 Feb. 24, 2005

(30) Foreign Application Priority Data

Aug. 19, 2003 (JP) ............................. 2003-294791

(51) Int. Cl.
*B60R 21/015* (2006.01)

(52) U.S. Cl. ...................... 180/273; 280/735; 177/144

(58) Field of Classification Search ................ 180/273; 280/735; 177/136, 144, 210 R
See application file for complete search history.

(56) References Cited

U.S. PATENT DOCUMENTS 6,835,899 B2 * 12/2004 Wolfe et al. ................. 177/144
6,841,741 B2 * 1/2005 Kajiyama .................... 177/144

FOREIGN PATENT DOCUMENTS

JP 2000-258233 9/2000

* cited by examiner

*Primary Examiner*—Randy W Gibson
(74) *Attorney, Agent, or Firm*—Hamre, Schumann, Mueller & Larson, P.C.

(57) ABSTRACT

An occupant detection apparatus including a weight sensor and a contact prevention unit. The weight sensor is provided together with a bottom structures positioned below a seat cushion of the vehicle seat, and measures a weight of an occupant on a vehicle by measuring a load to be applied to the vehicle seat. The contact prevention unit prevents a contact between the weight sensor and an interior trim of a vehicle cabin.

5 Claims, 7 Drawing Sheets

DETECTION APPARATUS FOR OCCUPANT OF A SEAT

BACKGROUND OF THE INVENTION

1. Field of the Invention

The present invention relates to an occupant detection apparatus, which detects the presence of an occupant on a vehicle seat.

2. Description of Relevant Art

As an example of these kinds of apparatus, the seat-weight measuring device, which detects the presence of an occupant by measuring a weight of a vehicle seat and which is disclosed in Japanese unexamined patent publication JP2000-258233, has been discovered.

FIG. 7 is an enlarged sectional view in which the relevant part of the seat-weight measuring device installed in a vehicle cabin is indicated. FIG. 8 is a exploded perspective view showing a floor carpet on a floor panel.

As shown in FIG. 7, a seat-weight measurement device 100 comprises a weight sensor 120 and a load absorption unit (a pin bracket 121 and a pin 122). The load absorption unit, which absorbs the creep or deflection due to the weight applied to the vehicle seat, is provided between the vehicle seat 110 and the weight sensor 120. The weight sensor 120, which converts the weight of the vehicle seat 110 into electrical signal, comprises a sensor plate 125 made of plate spring and a strain gauge 126 made of an insulating layer (not shown) formed by stacking electric circuits.

One end of the weight sensor 120 is fixed at a base 123 of a vehicle cabin, and the other end of the weight sensor 120 connects with a movable part (not shown) of the arm 124. Here, the arm 124 is pushed by a rail 130 of the vehicle seat 110 and is displaced, when a load applied to the vehicle seat 110 is transferred to the movable part.

In this seat-weight measurement device 100, when an occupant sits on the vehicle seat 110 and the vehicle seat 110 receives a weight of an occupant, a seat frame 111 is moved downwardly. In this occasion, since the pin bracket 121 and pin 122 are pushed by the seat frame 111 and are moved downwardly (a direction shown by arrow B), a bending moment due to the downward movement of the pin bracket 121 and pin 122 is detected by the weight sensor 120.

The seat-weight measurement device 100 measures the amount of the load applied to the vehicle seat 110 by processing electrical signal, which is obtained from the strain gauge 126 and is fluctuated in compliance with the bending moment.

The load absorption unit includes a pin bracket 121 and an arm 124. The pin bracket 121, which is positioned between the rail 130 and arm 124, is joined with the arm 124 through a pin 122 with play.

By providing this play, the accidental deformation or the manufacturing error in size of the vehicle parts is absorbed. Thus, the deflection absorbing mechanism does not transmit the load caused by the deformation to the weight sensor 120.

The floor carpet 300 composed of a cushion layer 320 and a surface layer 330 is laid on the floor panel 200. The floor carpet 300, as shown in FIG. 8, is molded into the almost same shape as the floor panel 200.

An installation area 301, onto which a driver's seat is provided, and an installation area 302, onto which a passenger seat is provided, are hollowed than the remainder of the floor carpet 300. The installation area 301 is surrounded by a front-wall 303, a rear-wall 305, an outside-wall 306 and an inside-wall 308. The installation area 302 is surrounded by a front-wall 304, a rear-wall 305, an outside-wall 307 and an inside-wall 309.

A part of the top of a floor-tunnel 210 of the floor panel 200 is covered with a tunnel cover 310 provided at the middle of the floor carpet 300. The remainder of the top of the floor-tunnel 210 is not covered with a tunnel cover 310 for allowing the provision of an instrumental center lower cover (not shown) and a center console (not shown). Thus, a notched part 311 is provided between the installation areas 301 and 302. As can be seen from FIG. 8, both side surfaces of the floor-tunnel 210 are covered with the inside walls 308 and 309, respectively.

Respective front-walls 303 and 304, rear-walls 305, outside-walls 307 and 306, and inside-walls 308 and 309 are formed by bending each surrounding areas of the installation areas 301 and 302 so as to surround the bottom (bottom structures) of the seat.

The weight sensor 120 of the seat-weight measurement device 100 is provided at downward position in an outside of respective seat (driver's seat and passenger seat). Here, the term "outside of respective seat" means the position in the vicinity of a vehicle door with respect to the seat.

As can be seen from FIG. 7, therefore, respective weight sensors 120 of the seat (driver s seat and passenger seat) are positioned in the vicinity of outside-wall 306 (or 307) of the floor carpet 300, and the clearance between the weight sensor 120 and the outside wall 306 (or 307) is quite narrow. Here, the width of the clearance is sufficient for inserting only a finger.

The floor carpet 300 is normally attached to the floor panel 200 using a clip (not shown) etc. In this case, if a load due to the occupant's motion in getting on and off the vehicle is applied to the floor carpet 300, the position with respect to the floor panel 200 of the floor carpet 300 may be deviated. That is, the position of the outside wall 306 (307) of floor carpet 300 may be changed to the position shown by dot-dash line (FIG. 7) due to the separation of the floor carpet 300 from the floor panel 200.

In this occasion, if the outside wall 306 (307) of the floor carpet 300 comes in contact with the pin bracket 121 or the head of the pin 122, the motion of the arm 124 may be disturbed. This reduces the accuracy of weight measurement by the weight sensor 120 and may cause a measurement error.

Therefore, the occupant detection apparatus which can prevent the drop of the accuracy in weight measurement that is caused by the floor carpet has been required.

SUMMARY OF THE INVENTION

The present invention relates to an occupant detection apparatus. This apparatus includes a weight sensor which measures a weight of an occupant on a vehicle seat and is provided together with bottom structures positioned below a seat cushion of the vehicle seat, and contact prevention means for preventing a contact between the weight sensor and an interior trim, e.g. a floor carpet laid on a floor, of a vehicle cabin.

In this apparatus, the contact between the weight sensor and a floor carpet (an interior trim) being peeled off from the floor can be prevented. Thus, the occurrence of the drop of the accuracy of the weight measurement due to the contact between the floor carpet and the weight sensor can be prevented.

In this apparatus, the weight sensor includes an arm bracket receiving a load to be applied to the vehicle seat, a sensor plate measuring a weight of the occupant based on a load received by the arm bracket, an arm transmitting a load received by the arm bracket to the sensor plate, a bracket pin connecting the arm bracket with the arm, and moving in an ups-and-downs direction in compliance with the load received by the arm bracket, and a base frame supporting the bracket pin while allowing a movement in an ups-and-downs direction of the bracket pin. The occupant detection apparatus having these constructions, it is preferable that contact prevention means is positioned in the vicinity of the bracket pin, and prevents a contact between the bracket pin and the floor carpet.

In this case, the contact between the bracket pin and a floor carpet that is peeled off from the floor can be prevented. Thus, the occurrence of the drop of the accuracy of the weight measurement due to the contact between the floor carpet and the bracket pin can be prevented.

In the occupant detection apparatus, it is preferable that bottom structures further including a seat bracket fixing the vehicle seat on a floor of a vehicle body, and contact prevention means is a protrusion provided on the seat bracket.

In this case, contact prevention means, which prevent the occurrence of the misdetection of the occupant due to the contact with the floor carpet, can be provided, without increasing the manufacturing process and number of the parts.

Additionally, it is still more preferable that the sensor plate is provided with a strain gauge, which measures a deformation of the sensor plate caused by the load received by the arm bracket, and that the weight of the occupant is measured based on a measurement result of the strain gauge.

It is further preferable that contact prevention means contact prevention means elongates in a direction parallel to a longitudinal direction of the bracket pin, and that an end of contact prevention means is in the vicinity of the interior trim (floor carpet) than the bracket pin. Additionally, it is preferable that contact prevention means is integral with the seat bracket.

DETAILED DESCRIPTION OF THE PREFERRED EMBODIMENT

The preferred embodiments of the present invention will now be described with reference to accompanying drawings.

First Embodiment

Figure 1:
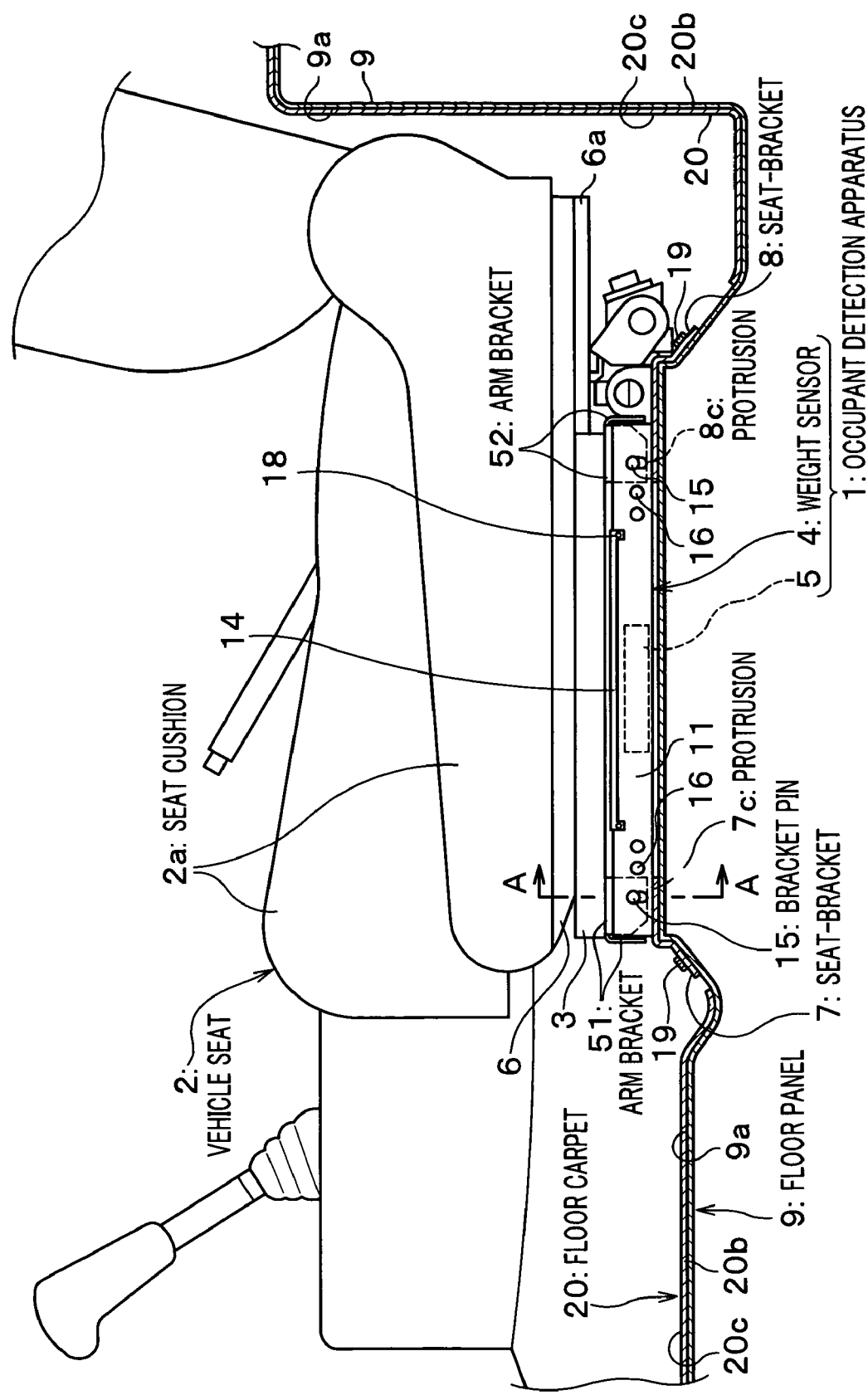
FIG. 1 is a side view of the occupant detection apparatus, a part of which is indicated by cross-sectional view.

As shown in FIG. 1, an occupant detection apparatus 1 is an apparatus for detecting an occupant on a vehicle seat 2 and includes a weight sensor 4 and a control unit 5. The weight sensor 4 measures a weight of an occupant on the vehicle seat 2.

In this occupant detection apparatus 1, the weight sensor 4 measures a load being applied to the vehicle seat 2 by the occupant sitting on the vehicle seat 2. Then, the control unit 5 performs the processing of the measurement result obtained by the weight sensor 4.

Data signal generated in accordance with the processing of the measurement result is supplied to respective control unit, such as a control unit of airbag apparatus (not shown) or a control unit of a seatbelt pretensioner (not shown). Thereby, since the distinction between an adult, a child, and a baby can be achieved by utilizing data signal, the control of the airbag's deployment and the control of the pre-tension of the seatbelt can be achieved by utilizing the distinction result.

In this embodiment, a passenger seat is indicated in figure as an example of the vehicle seat 2. This vehicle seat 2 has a seat cushion 2a and is for single use. The vehicle seat 2 is placed on a seat frame 6 made from steel plate and is supported by the seat frame 6.

A slider 6a (see FIG. 5) is provided at both sides in a width direction of the vehicle seat 2. Respective sliders 6a and 6a are placed in parallel along a fore-and-rear direction of the vehicle seat 2.

Figure 2:
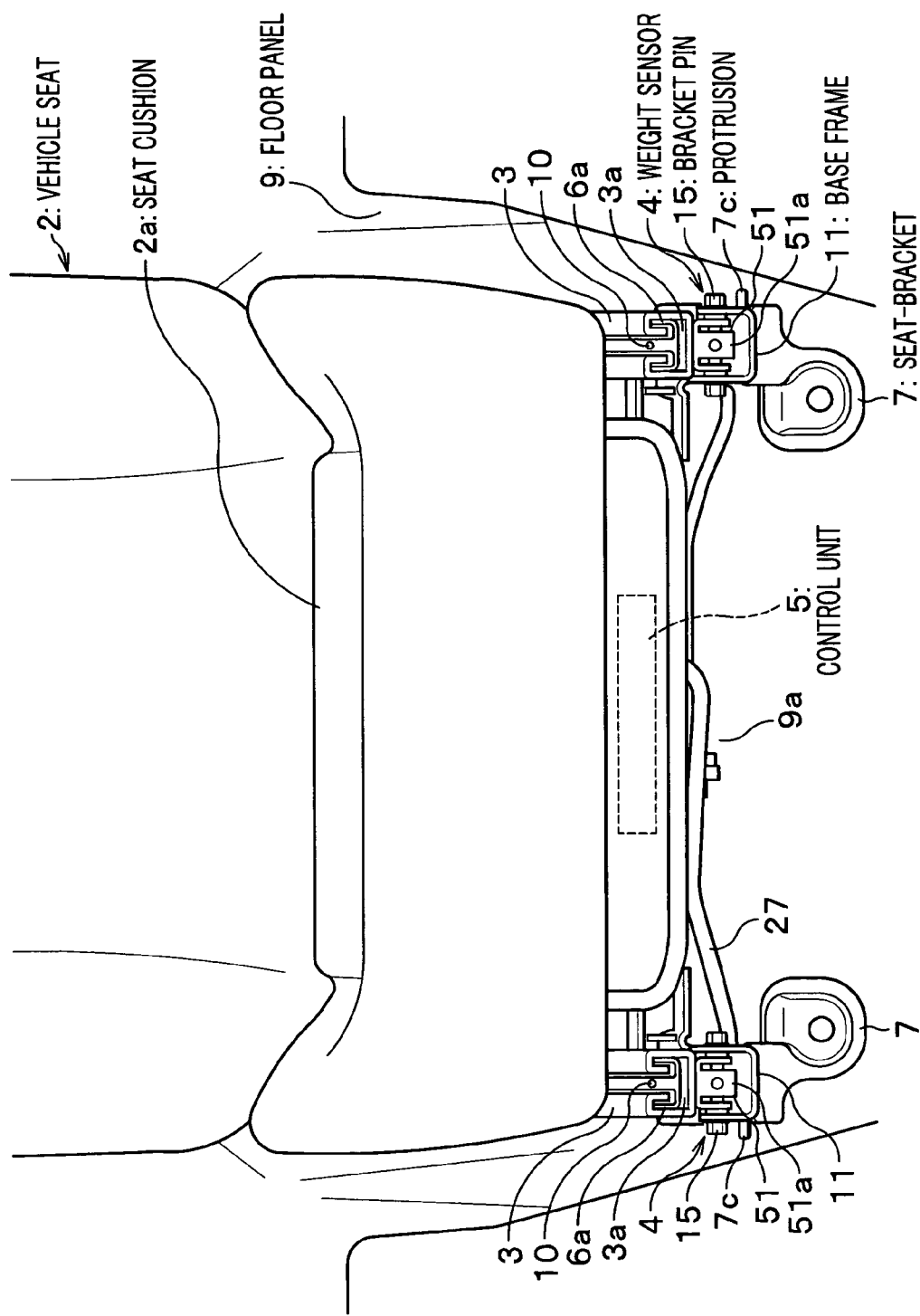
FIG. 2 is a front elevation view of the occupant detection apparatus, a part of which is indicated by cross-sectional view.
Figure 5:
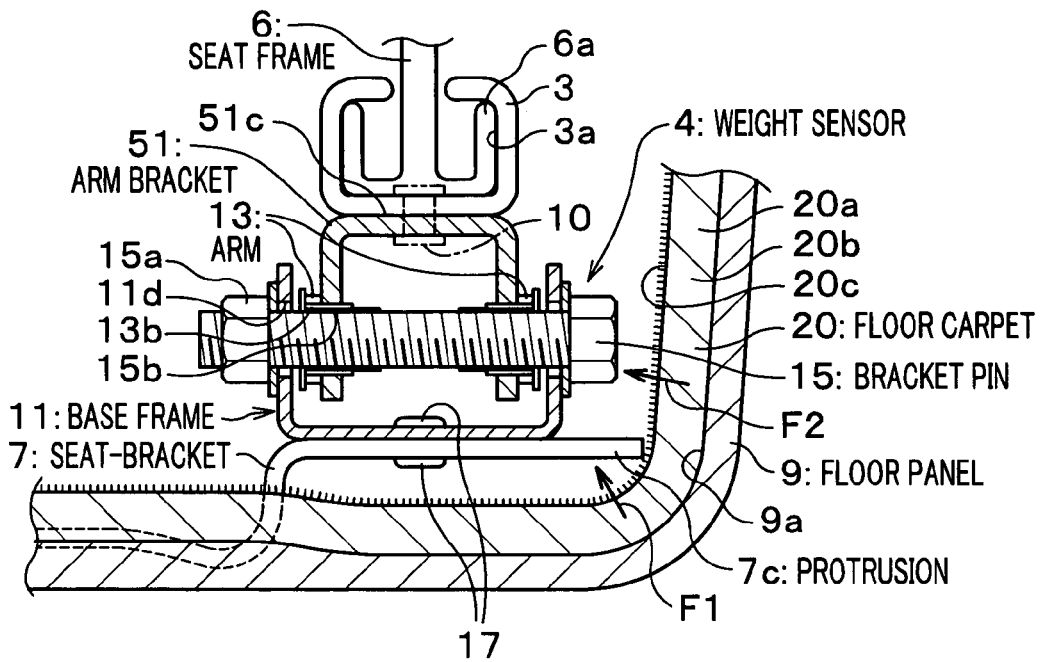
FIG. 5 is an enlarged sectional view along a line A-A.

As shown in FIG. 2 and FIG. 5, the slider 6a engages with a guide 3a of the seat-rail 3 and is allowed to slide together with the vehicle seat 2 in a fore-and-rear direction along the guide 3a.

As shown in FIG. 2, the seat-rail 3 is made from a steel plate and is a C-like shaped member in sectional viewing. The seat-rail 3 is placed in a position opposing to respective slider 6a. Therefore, a total of two seat rails 3 are placed on the underside of the vehicle seat 2 along a fore-and-rear direction of the vehicle seat 2. The guide 3a, which engages with the slider 6a and allows the slide of the slider 6a, is formed on the seat-rail 3.

The weight sensor 4 is provided at the bottom of the seat-rail 3. That is, the seat-rail 3 is connected by a pin 10 to a arm bracket 51 (52) which is part of the weight sensor 4 (see FIG. 2).

Figure 3:
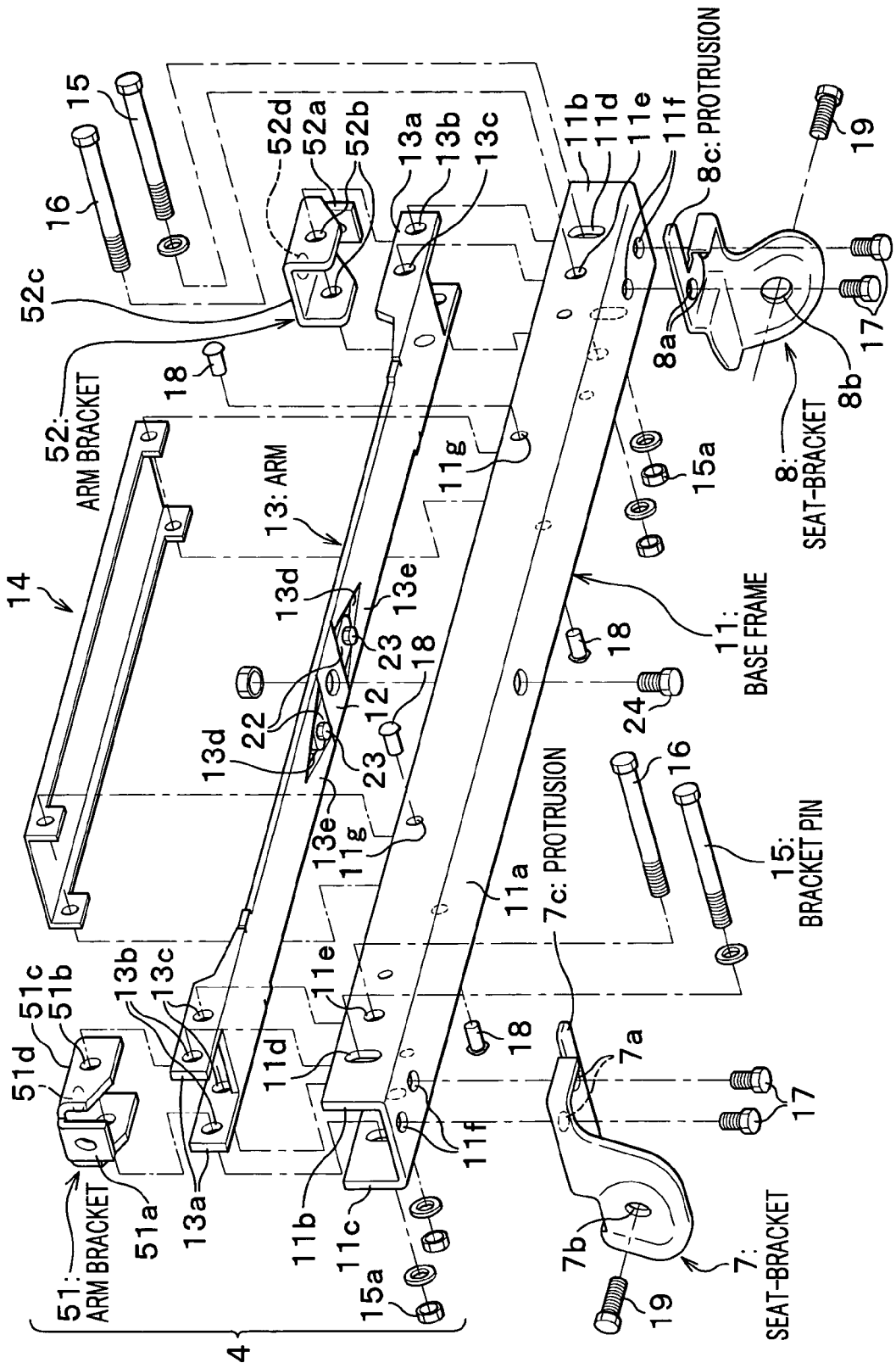
FIG. 3 is an exploded perspective view of the weight sensor of the occupant detection apparatus.
Figure 4:
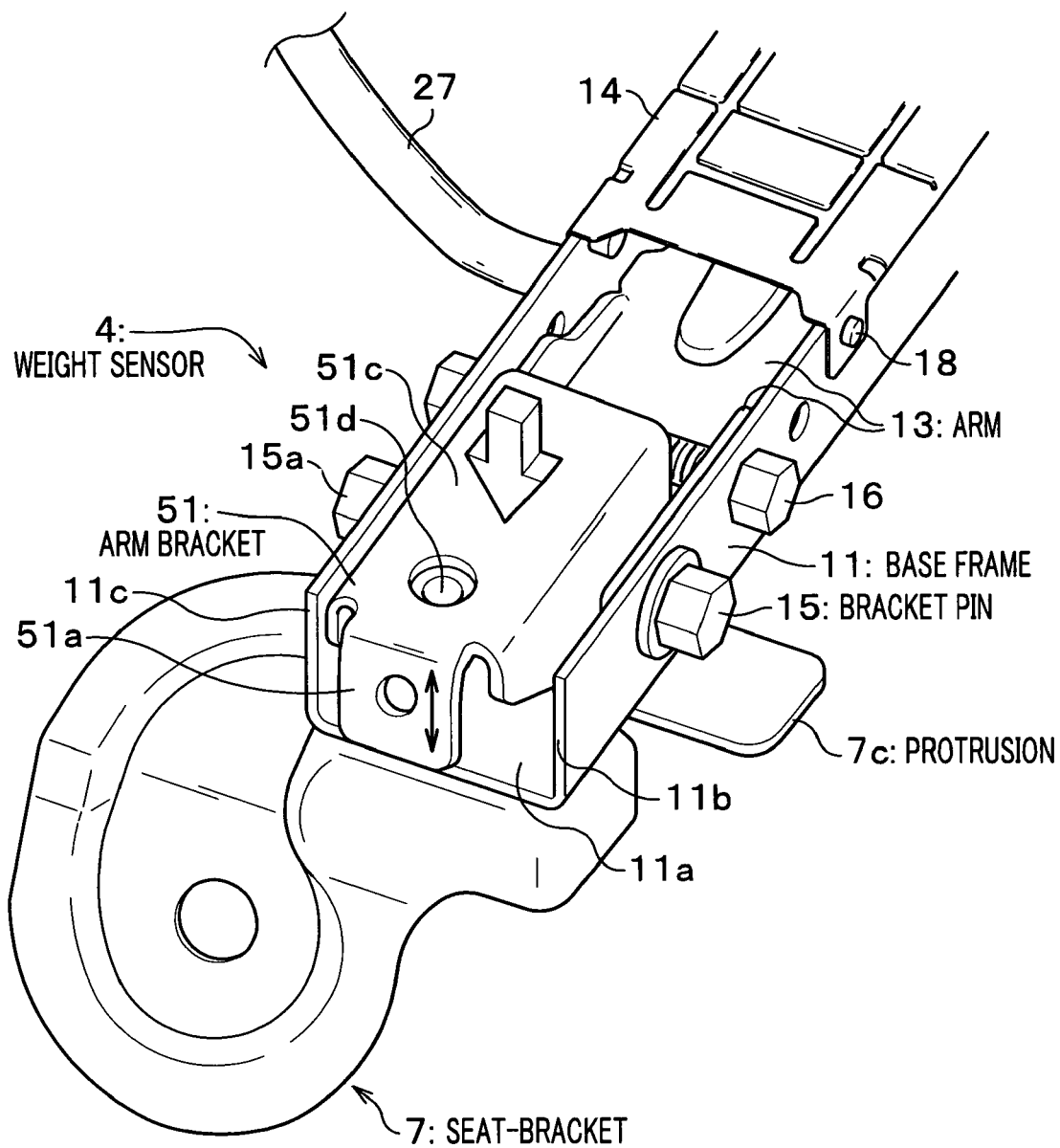
FIG. 4 is an enlarged perspective view in which the weight sensor of the occupant detection apparatus is indicated.
Figure 6:
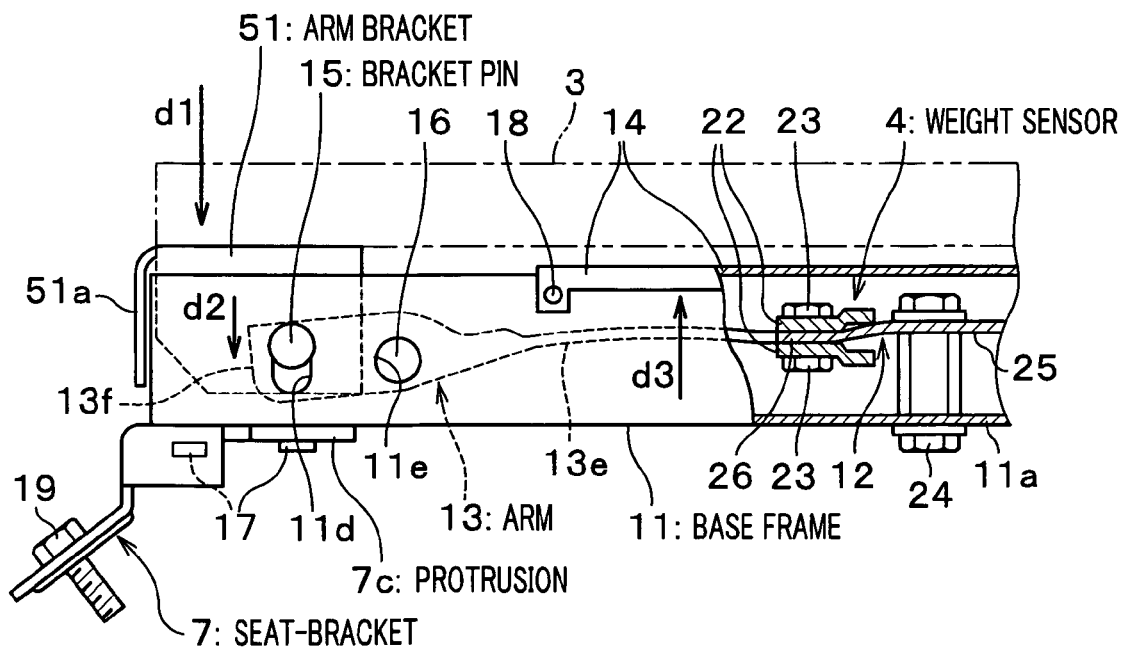
FIG. 6 is an enlarged perspective view of the weight sensor of the occupant detection apparatus, a part of the weight sensor is indicated by cross-sectional view.
Figure 7:
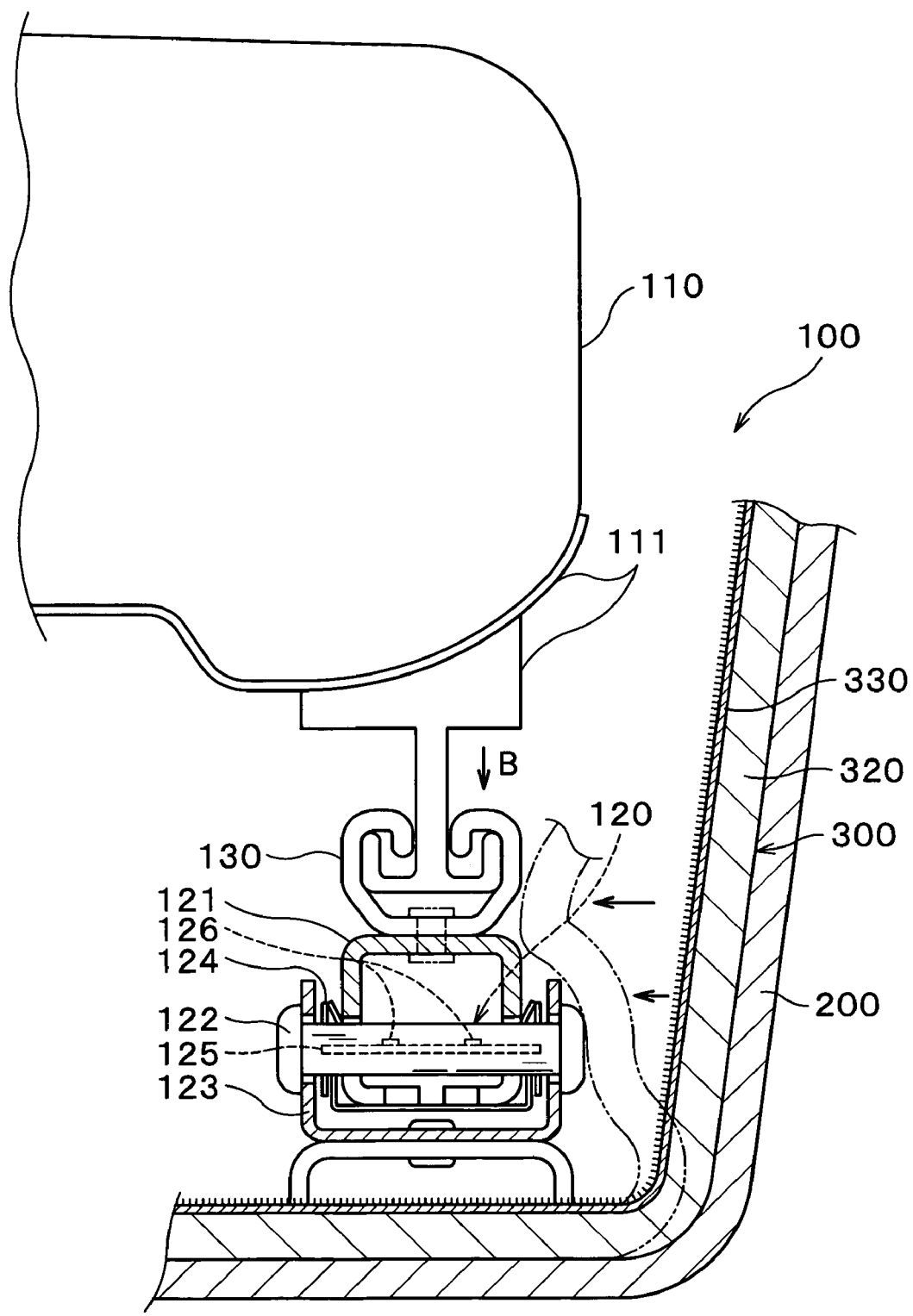
FIG. 7 is an enlarged sectional view in which the relevant part of the seat-weight measuring device installed in a vehicle cabin is being indicated.
Figure 8:
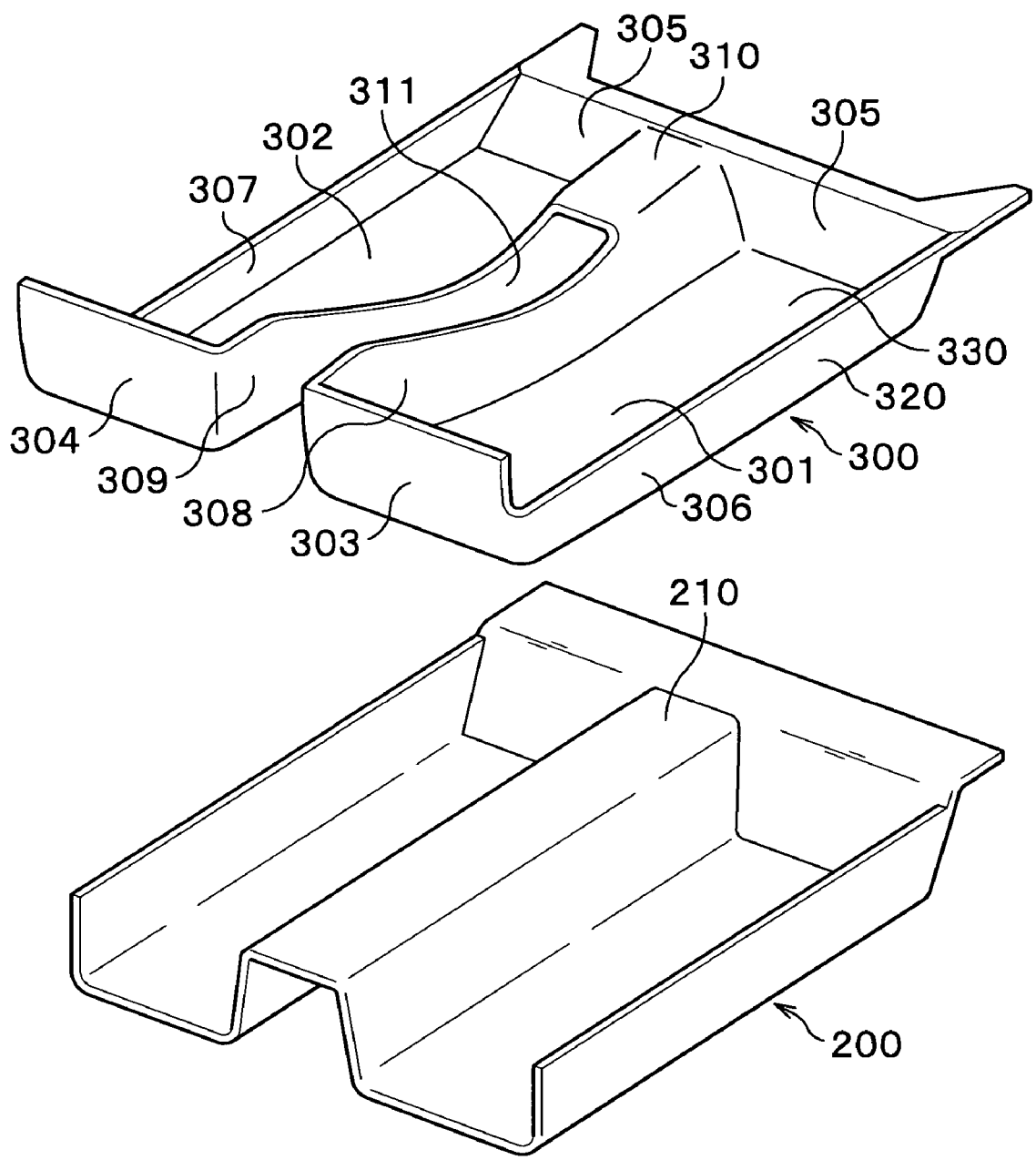
FIG. 8 is a exploded perspective view showing a floor carpet on a floor panel.

FIG. 3 is an exploded perspective view of the weight sensor 4 of the occupant detection apparatus 1 according to the present invention. FIG. 4 is an enlarged perspective view in which the weight sensor 4 of the occupant detection apparatus 1 according to the present invention is indicated. FIG. 5 is an enlarged sectional view along a line A-A. FIG. 6 is an enlarged perspective view of the weight sensor 4 of the occupant detection apparatus 1, a part of the weight sensor 4 is indicated by cross-sectional view.

As shown in FIG. 3, the weight sensor 4 is a box-like shaped unit which elongates in a fore-and-rear direction of the vehicle seat 2. Each bottom in a fore-and-rear end of a base frame 11 is provided with seat brackets 7 and 8, respectively.

By fixing the seat brackets 7 and 8 to the floor panel 9 (see FIG. 2) using bolts 19, the vehicle seat 2 (see FIG. 2) is installed in the vehicle body (vehicle cabin) together with the weight sensor 4.

In this embodiment, the term "the bottom structures of the vehicle seat 2" denotes structural members provided between the seat cushion 2a and the floor panel 9. The bottom structures of the vehicle seat 2 is mainly composed of the seat frame 6, the seat-rail 3, seat brackets 7 and 8, and a group of units included in the weight sensor 4. Here, a group of units included in the weight sensor 4 is for example the base frame 11 and arm brackets 51 and 52.

The weight sensor 4 is composed of the base frame 11, arm brackets 51 and 52, a sensor plate 12, an arm 13, and a heat insulator 14.

The base frame 11 is an elongated rail-like shaped member, and is provided with arm brackets 51 and 52, which receive a load caused by an occupant and the vehicle seat 2, at end part in a fore-and-rear direction of the base frame 11. The load received by respective arm brackets 51 and 52 is transferred to the sensor plate 12 through the arm 13.

Thereby, the sensor plate 12, which is provided at the center in a fore-and-rear direction of the arm 13 and is provided with an electric circuit, measures the load received by respective arm brackets 51 and 52. The top of the sensor plate 12 is covered with the heat insulator 14.

The weight sensor 4 of the present embodiment is similar to those disclosed in JP application No.2002-252263 filled on Aug. 30, 2002 and U.S. patent application Ser. No. 10/637,287 filed on Aug. 8, 2003, and both of which are hereby incorporated by reference in their entirety.

In the present embodiment, the construction of the weight sensor 4 is not limited to these. For example, any types of sensor, as long as the sensor is positioned between the vehicle seat 2 and the floor panel 9 and can detect the presence of an occupant, can be adoptable.

The base frame 11 is a C-like shaped member in sectional viewing and is obtained by a press molding of a steel plate. The base frame 11 is composed of a base plate 11a and side walls 11b and 11c.

The side wall 11b and the side wall 11c are positioned on opposing-sides of the base plate 11a. The base frame 11 accommodates arm brackets 51 and 52, the arm 13, and the sensor plate 12 in the depression part thereof.

Each bottom in a fore-and-rear end of the base frame 11 is provided with bolt holes 11f. These bolt holes 11f are used for fixing seat brackets 7 and 8 to the base frame 11 by bolts 17. Both ends in a fore-and-rear direction of respective side walls 11b and 11c are provided with a long hole 11d and a support-pin hole 11e.

The position of the long hole 11d is in the vicinity of the end of the side wall 11b (11c) than the support-pin hole 11e. A bracket pin 15 for supporting the arm bracket 51 (52) and arm 13 while allowing the ups-and-downs directions movement of the arm 13 is inserted in the long hole 11d.

When the weight sensor 4 receives a load, since the bracket pin 15 can slide along the long hole 11d and a support pin 16 inserted in the support-pin hole 11e serves as a supporting point, arm brackets 51 and 52 and the arm 13 are moved in an ups-and-downs direction.

Pin holes 11g for attaching the heat insulator 14 of thin plate to the base frame 11 is bored on respective side walls 11b and 11c. The position where these pin holes 11g are bored is the position near the center in a longitudinal direction of the base frame 11 than the support-pin hole 11e.

As shown in FIG. 3, respective arm brackets 51 and 52 are obtained by a press molding of a steel plate and are provided with a contact area (top surface 51c) by which the load applied to the weight sensor 4 is received.

As shown in FIG. 5, the arm bracket 51 (52) is provided with a bracket hole 51d (FIG. 4) and is fixed to the seat-rail 3 using a fixing-pin 10 inserted into the bracket hole 51d. When fixing the arm bracket 51 (52) to the arm 13, a top surface 51c of respective arm brackets 51 and 52 is parallel to the top of the base frame 11, and is slightly raised in height than the top of the base frame 11.

Additionally, a bracket hole 51b (52b), through which the bracket pin 15 is inserted, is provided on both sides of the arm bracket 51 (52), and a bent plate 51a (52b) for preventing the intrusion of foreign objects, such as dust, into the weight sensor 4 is formed on the arm bracket 51 (52). As can be seen from FIG. 3, the bent plate 51a is formed at fore-side end of the arm bracket 51, and the bent plate 52b is formed at rear-side end of the arm bracket 52.

A load to be applied to respective arm brackets 51 and 52 is transmitted to the arm 13 through the bracket pin 15. This is because the arm bracket 51 (52) is connected to the arm 13 by the bracket pin 15 and a nut 15a.

The bracket pin 15, as shown in FIG. 3, is inserted into the long hole 11d, a bracket pin hole 13b, and bracket hole 51b (52b), and is then screwed with the nut 15a.

In this embodiment, the bracket pin 15 is normally positioned within the long hole 11d so that ups-and-downs motion of the bracket pin 15 is not disturbed due to the interference between the bracket pin 15 and the fringe of the long hole 11d. That is, sufficient clearances are provided around the bracket pin 15, i.e. the clearance is provided on the left-side, right-side, upper-side and bottom-side of the bracket pin 15.

Therefore, when the weight sensor 4 receives a excess load, the bracket pin 15 moves downwardly in response to the load, and is then stopped at a lower edge of the long hole 11d.

Respective seat brackets 7 and 8 fix the vehicle seat 2 and the base frame 11 to the floor panel 9, and is obtained by a press molding of a steel plate.

The seat bracket 7 is provided with bolt holes 7a and 7b and the seat bracket 8 is provided with bolt holes 8a and 8b. In this embodiment, the seat bracket 7 (8) is fixed to the base frame 11 by bolt 17 using this bolt hole 7a (8a), and is also fixed to the floor panel 9 by a bolt 19 using this bolt hole 7b (8b).

A protrusion 7c (8c) which elongates in an outward direction with respect to the vehicle seat 2 is provided on the seat bracket 7 (8). The protrusion 7c (8c) and the seat bracket 7 (8) are formed into an integral body. Here, the term "outward direction" means the direction toward a vehicle door when the seat is installed in the vehicle cabin.

Referring to FIG. 5, the protrusion 7c (8c) prevents the contact between the weight sensor 4 and a side-wall part 20a of a floor carpet 20 that is positioned sideward with respect to the weight sensor 4.

As shown in FIG. 6, the protrusion 7c positions just under the bracket pin 15, and elongates in a sideward direction, in parallel with the bracket pin 15. An end of the protrusion 7c reaches in the vicinity of the side-wall part 20a of the floor carpet 20 (see FIG. 5).

As shown in FIG. 1, the floor panel 9 is a steel plate provided under the vehicle seat 2 and is constituting part of a vehicle body.

A floor carpet 20 is provided on a surface 9a of the floor panel 9. In this embodiment, an adhesive-agent for bonding the floor carpet 20, a sound insulator, or a soundproof material, to the floor panel 9 may be coated on the surface 9a of the floor panel 9.

As shown in FIG. 1 and FIG. 5, the floor carpet 20 is composed of a cushion layer 20b and a surface layer 20c. The cushion layer 20b is made of porous elastic body, such as urethane. The surface layer 20c is formed on the cushion layer 20b.

In this embodiment, various kinds of carpet, for example, a conventional floor carpet adopted in a vehicle, may be adoptable as the floor carpet, and the material and shape of the carpet is not limited to the particular material and shape.

As shown in FIG. 3, a sidewall 13a is provided on both sides in an fore-side end of the arm 13, and also a side wall 13a is provided on both sides in an rear-side end of the arm 13.

Each side wall 13a is provided with the bracket pin hole 13b, through which the bracket pin 15 is passed, and a support-pin hole 13c, through which the support pin 16 is passed.

The sensor plate 12 is provided at the center in a longitudinal direction of the arm 13.

As can be seen from FIG. 3, the arm 13 is composed of a left-side arm and a right-side arm, which are joined with the sensor plate 12.

A notched part 13d is provided at end-part near the sensor plate 12 of the left-side arm and right-side arm, respectively. The region where the notched part 13d is formed on the arm 13 serves as a displacement part 13e. Thus, the left-side arm and the right-side arm connects with the sensor plate 12 through the displacement part 13e, respectively.

When the arm bracket 51 (52) receives a load and is moved downwardly, since the arm bracket 51 (52) is connected to the arm 13 through the bracket pin 15, an end part connected to the arm bracket 51 (52) of the arm 13 is also moved downwardly.

In this occasion, since the arm 13 deforms slightly in compliance with the load to be applied to the arm bracket 51 (52), the displacement part 13e of the arm 13 is also deformed. Thereby the load applied to the vehicle seat 2 is transferred to the sensor plate 12 through the arm bracket 51, the bracket pin 15, and the displacement part 13e of the arm 13.

Referring to FIG. 3 and FIG. 6, the sensor plate 12, which has an electric circuit thereon, is positioned at the middle in a longitudinal direction of the base frame 11, and is fixed to the base frame 11 by a bolt at the center-part thereof.

Opposite ends of the sensor plate 12 connect with the displacement part 13e of the arm 13 (the left-side arm and the right-side arm) using a sensor bracket 22 and nut 23. The sensor plate 12 is provided with a strain gauge unit (not shown) comprising a plurality of strain gauges, which are joined by electric wiring so as to provide a bridge circuit.

Referring to FIG. 6, the sensor plate 12 is composed of a fixing part 25 and displacement parts 26 and 26, which are provided at both sides of the fixing part 25. The width of the region between the fixing part 25 and the displacement part 26 is narrowed so that deformation will occur easily at this region.

The displacement part 26 of the sensor plate 12 is displaced in compliance with a turn of the arm 13, when the arm 13 is turned around the support pin 16.

In this embodiment, a plurality of strain gauges (not shown) are provided on the fixing part 25 and the displacement parts 26. When the displacement part 26 moves in a direction shown by arrow d3, each of strain gauges receives a tensile load (force) or a compressive load (force).

Here, electrical resistance of each strain gauges varies depending on the tensile force (load) and the compressive force (load). That is, electrical resistance of the bridge circuit is varied depending on the variation of electrical resistance of respective strain gauges.

In the present invention, therefore, the amount of displacement of the displacement part 26, i.e. the amount of the load (weight) to be applied to the vehicle seat 2 can be obtained by measuring the electrical resistance of the bridge circuit.

The sensor bracket 22 consists of four parts, that is, fore-side part, rear-side part, upper-side part, and lower-side part. The sensor plate 12 and displacement part 13e of the arm 13 are connected by using sensor brackets. To be more precise, the sensor plate 12 and displacement part 13e are sandwiched between sensor brackets, which are fixed to the sensor plate 12 by a bolt 23.

The control unit 5 shown by dot-dash line in FIG. 1 is equipped with the CPU and ROM, and is fixed at the floor panel 9 or a seat frame 6 of the vehicle seat 2.

The control unit 5 connects with the weight sensor 4 through a cable 27 (FIG. 2). This control unit 5 applies a voltage to each bridge circuits and measures a current value streaming the bridge circuit. Thereby, the control unit 5 obtains the value of the resistance (hereinafter indicated as resistance value) of the bridge circuit by the computing based on the current value. Then, the control unit 5 generates the output signal based on the resistance value of the bridge circuit. The output signal is supplied to respective control unit, such as a control unit of airbag apparatus (not shown).

In the present embodiment, as described above, the control unit 5 outputs the output signal, which are generated based on the resistance value of the bridge circuit. But, the signal to be outputted from this control unit 5 is not limited to this. For example, the control unit 5 may output the signal indicating the unique identification code, such as a category name.

In the present embodiment, unique category names are used as this identification code. In this case, the control unit 5 refers to the data base recorded on the ROM and compares the resistance value of the bridge circuit with a threshold value. Then, the control unit 5 categorizes the obtained resistance value of the bridge circuit into one of predetermined categories. Thereby, in this case, the output signal supplied from the control unit is the signal indicating the selected category name.

By adopting this classification (categorization), the handling of the output signal in another unit equipped in the vehicle can be facilitated. For example, the occupant detection apparatus 1 can categorize the weight of the occupant sitting on the vehicle seat 2 into the category of "High" or "Low" based on the obtained resistance value. Here, "High" means that the weight of the occupant is heavy, and "Low" means that the weight of the occupant is light. This classification is performed by comparing the resistance value with a threshold value.

In the present invention, the categorization of the occupant is performed based on the resistance value of the bridge circuit. Thus, the further detailed classification can be enabled based on the magnitude of the resistance value. Thereby, the categorization of the occupant sitting on the vehicle seat, such as "child", "adult", or "woman", can be realized.

From these points of view, output signal to be supplied from the control unit 5 may be unique signal which is determined to each vehicle for identifying the type of the occupant, such as baby, child, woman or man. Additionally, output signal may be a signal determined in compliance with the amount of the resistance value or the change of the resistance value.

Detection of Occupant

Next, the detection of the occupant performed by the occupant detection apparatus 1 utilizing a weight will be explained.

When the occupant is not on the vehicle seat 2, a load corresponding to the weight of the vehicle seat 2 is applied to the weight sensor 4 (see FIG. 1).

This load is applied from the seat frame 6 of the vehicle seat 2 to the arm bracket 51 (52) through the seat-rail 3, and pushes the arm bracket 51 (52) downwardly. That is, arm bracket 51 (52) is pushed in a direction shown by arrow d1 in FIG. 6.

Thus, since the bracket pin 15 is allowed to move in an ups-and-downs direction along the long hole 11d, the bracket pin 15 and an end part 13f of the arm 13 is moved downwardly. In this occasion, on the other hand, since the seat bracket 7 (8) is fixed to the floor panel 9, the seat bracket 7 (8) and the base frame 11 fixed to the seat bracket 7 (8) are not moved.

Thereby, the load which acts in a direction shown by arrow d2 is applied to the end part 13f of the arm 13. Here, since the support pin 16 exists, when end part 13f is moved in the direction shown as arrow d2, a load, which acts in a direction shown by arrow d3, is added to sensor plate 12 side of the arm 13.

This causes the deformation of the sensor plate 12, and also adds the load, which acts in a direction shown by arrow d3, to the displacement part 13e and the sensor plate 12.

In this occasion, the resistance value of the strain gauge varies in compliance with the variation amount of the displacement part 13e. Thus, the resistance value of the bridge circuit as the whole fluctuates in compliance with the variation amount of the displacement part 13e. In the present invention, therefore, the presence or absence of occupant on the vehicle seat 2 can be detectable by measuring the resistance value of the bridge circuit, which varies in compliance with the variation of the load to be applied to the vehicle seat 2.

Application of the Occupant Detection System

The occupant detection apparatus 1 according to the present invention would be suitable for a use in an airbag apparatus.

The airbag apparatus quickly deploys the airbag using an inert gas in order to secure the occupant against injury in the event of collision of vehicle. In recent year, the airbag apparatus, which determines the time of inflation or the inflation size of the airbag after checking the presence of the occupant on the vehicle seat, or after checking the physique or sitting position of the occupant, has been known.

By adopting the present invention's occupant detection apparatus 1 to these conventional airbag apparatus, the checking of whether or not an occupant is on the seat, the checking of whether the occupant sitting on the seat is adult or child, and the checking of whether the weight of the occupant sitting on the vehicle seat is heavy, can be performable. Thereby, the inflation characteristics of the airbag can be controlled suitably.

Function of the Occupant Detection Apparatus

The functions of the occupant detection apparatus according to the present embodiment will be explained.

As shown in FIG. 5, the floor carpet 20 is normally bonded to the surface 9a of the floor panel 9. In this state, if a load due to the occupant's motion in getting on and off the vehicle is applied to the floor carpet 20, the position with respect to the floor panel 9 of the floor carpet 20 may be deviated.

If the floor carpet 20 positioned in the vicinity of the weight sensor 4, for example, moves toward the weight sensor 4, since the protrusion 7c of the seat bracket 7 is being prolonged toward the side-wall part 20a, the protrusion 7c prevents the contact between the weight sensor 4 (bracket pin 15) and the side-wall part 20a of the floor carpet 20 positioned sidewardly with respect to the weight sensor 4.

Therefore, since the downward movement of the bracket pin 15 when the arm bracket 51 (52) moves downwardly in compliance with a load to be applied to the vehicle seat 2 is not disturbed, the occurrence of the drop of the accuracy of the weight measurement due to the contact between the floor carpet 20 and the bracket pin 15 can be prevented.

Although there have been disclosed what are the patent embodiments of the invention, it will be understood by person skilled in the art that variations and modifications may be made thereto without departing from the scope of the invention, which is indicated by the appended claims.

In the above described embodiments, the explanation about the occupant detection apparatus 1 has been performed using the occupant detection apparatus 1 provided at the bottom of the passenger seat as example. But, the present invention's occupant detection apparatus 1 is not limited to this, the apparatus provided at a driver s seat or rear-side seat can be adoptable.

In the present embodiment, the weight sensor which detects the weight of the occupant by measuring the change of the resistance value of the strain gauge is adopted. But, the weight sensor which detects the weight of the occupant by measuring the pressure to be caused by the occupant sitting on the vehicle seat 2 may be adoptable.

Additionally, the position where the protrusion 7c is provided is not limited to the seat bracket 7 (8). For example, the protrusion 7c may be provided on bottom structures of the vehicle seat 2 as long as the contact between the weight sensor 4 and the floor carpet 20 can be prevented. That is, the protrusion 7c (8b) may be provided at the seat frame 6, the seat-rail 3, the base frame 11, or arm bracket 51 (52).

In this occasion, the protrusion may be formed into an integral body with the bottom structures, or may be provided independently with respect to the bottom structures.

If the protrusion is independently provided, the protrusion is attached to the bottom structures using a bolt or pin.

What is claimed is:

1. An occupant detection apparatus comprising:
a weight sensor which measures a weight of an occupant on a vehicle seat and is provided together with bottom structures positioned below a seat cushion of the vehicle seat, the weight sensor including:
an arm bracket receiving a load applied to the vehicle seat;
a sensor plate measuring the weight of the occupant based on the load received by the arm bracket;
an arm transmitting the load received by the arm bracket to the sensor plate;
a bracket pin connecting the arm bracket with the arm, and moving in an up-and-down direction in compliance with the load received by the arm bracket; and
a base frame supporting the bracket pin while allowing a movement in the up-and-down direction of the bracket pin; and
contact prevention means for preventing a contact between the weight sensor and an interior trim of a vehicle cabin, the interior trim being a floor carpet laid on a floor of a vehicle cabin, said contact prevention means being positioned in the vicinity of the bracket pin and preventing contact between the bracket pin of the weight sensor and the interior trim.

2. An occupant detection system according to claim 1, wherein the bottom structures further include a seat bracket fixing the vehicle seat on the floor of the vehicle cabin, and wherein the contact prevention means includes a protrusion provided on the seat bracket.

3. An occupant detection system according to claim 1, wherein the sensor plate is provided with a strain gauge, which measures a deformation of the sensor plate caused by the load received by the arm bracket, and wherein the weight of the occupant is measured based on a measurement result of the strain gauge.

4. An occupant detection system according to claim 1, wherein said contact prevention means is elongated in a direction parallel to a longitudinal direction of the bracket pin, and an end of contact prevention means is closer to the interior trim than the bracket pin.

5. An occupant detection system according to claim 4, further comprising a seat bracket, wherein said contact prevention means is integral with the seat bracket.

* * * * *